United States Patent
Hsu et al.

(10) Patent No.: US 7,120,642 B2
(45) Date of Patent: Oct. 10, 2006

(54) AUTOMATIC VALIDATION METHOD FOR MULTIMEDIA PRODUCT MANUALS

(75) Inventors: Liang H. Hsu, West Windsor, NJ (US); Peiya Liu, East Brunswick, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 420 days.

(21) Appl. No.: 10/237,453

(22) Filed: Sep. 9, 2002

(65) Prior Publication Data

US 2003/0051216 A1   Mar. 13, 2003

Related U.S. Application Data

(60) Provisional application No. 60/318,343, filed on Sep. 10, 2001.

(51) Int. Cl.
*G06F 17/30* (2006.01)
*G06F 17/00* (2006.01)

(52) U.S. Cl. .................. 707/102; 707/101; 707/103 R; 707/104.1; 715/513

(58) Field of Classification Search ................ 707/100, 707/104, 10, 101, 102, 103, 103 X, 104.1, 707/103 R; 705/1, 7; 713/176; 434/118; 715/513; 717/121
See application file for complete search history.

(56) References Cited

U.S. PATENT DOCUMENTS

| | | | |
|---|---|---|---|
| 6,171,109 B1* | 1/2001 | Ohsuga | 434/118 |
| 6,256,773 B1* | 7/2001 | Bowman-Amuah | 717/121 |
| 6,377,956 B1* | 4/2002 | Hsu et al. | 707/104.1 |
| 6,502,102 B1* | 12/2002 | Haswell et al. | 707/102 |
| 6,609,200 B1* | 8/2003 | Anderson et al. | 713/176 |
| 6,633,878 B1* | 10/2003 | Underwood | 707/100 |
| 6,925,595 B1* | 8/2005 | Whitledge et al. | 715/513 |
| 7,039,594 B1* | 5/2006 | Gersting | 705/7 |
| 2002/0087571 A1* | 7/2002 | Stapel et al. | 707/100 |
| 2004/0220815 A1* | 11/2004 | Belanger et al. | 705/1 |

* cited by examiner

*Primary Examiner*—Thuy N. Pardo
(74) *Attorney, Agent, or Firm*—Donald B. Paschburg; F. Chau & Associates, LLP

(57) ABSTRACT

A Product Document Constraint Specification Language (PDCSL) is provided for a document author to represent various types of documentation guidelines that must be enforced within documents or across different documents. A Document Constraint Analyzer (DCA) takes as input a set of document files together with a document constraint specification file, extracts and examines the contents, attributes, and relationships associated with the document objects, and evaluates the logical expressions specified in the document constraints. If a document constraint is not satisfied, an action can be taken to correct the documents or provide an explanation to the document author.

20 Claims, 24 Drawing Sheets constraint <identifier>: <description> for all
        <target object declarations with ranges>
    there exist
        <intermediate object declarations with ranges>
    counter
        <counting object declarations with ranges>
    logical expression
        if
            <antecedent>
        imply
            <consequent>
        action
            <message>
        end
end Document Constraint Specification

FIG. 3 e: ALL in 31.sgm;
e: AnyDoc in 31.sgm;
b: ParaX, ParaX2, ParaX3, ParaX4, ParaX5 in 10569420.sgm;
b: HeadingX, ParaX in 30276430.sgm;
c: ALL under e;
g: ALL above e;

p: string in content(e);
p: string in proper-content(e);
p: string in attribute(e, a);
b: string in prefix(p);
b: string in suffix(p);
b: string in matching-substrings(p);

n: for Figure in 31.sgm;   (where n is a counter for Figure object in 31.sgm)
m: for string p under e;   (where m is a counter for string p under object e)
f: file in $MMDOCDBDIR/schematics;
d: directory of $MMDOCDIR;

Examples of Document Logical Variables for Document Objects

FIG. 4 tag(e) = the tag of object e
attribute(e, a) = the value of the attribute a of object e
content(e) = the content of object e
proper-content(e) = the proper content of object e
suffix (p) = a set of substrings that are suffixes of string p
prefix (p) = a set of substrings that are prefixes of string p
matching-substrings(p) = the set of matching substrings of string p
matching-substring(p, n) = the n-th matching substring of string p Document Function Symbols for Content and Attributes

FIG. 5 is-tag(t, e) = true, if t is the tag of object e
is-attribute(a, e) = true, if identifier a is an attribute of object e
is-string(p, e) = true, if string p is in the content of object e
is-proper-string(p, e) = true, if string p is in the proper content of object e Document Predicate Symbols for Content and Attributes

FIG. 6

FIG. 7 p matches <pattern> = true, if string p matches the pattern specified by a regular expression
<pattern> = { <sequence of pattern terms> }
<pattern term> = <subpattern> or / <subpattern> / or
　　　　　　　　<subpattern group> or / <subpattern group> /
<subpattern> = " <sequence of characters> " or
　　　　　　　[ <subset of characters> ]<number of repetitions> or
　　　　　　　[^ <subset of characters> ]<number of repetitions>
<number of repetitions> = 1, 2, 3, ... , ? (optional), * (0 or more), + (one or more)
<subpattern group> = ( <sequence of subpatterns> )<number of repetitions>

Document Pattern Matching Predicate parent(e) = the parent object of object e
parent-of-string(p) = the object that directly contains string p
ancestors(e) = the set of all ancestor objects of object e
children(e) = the set of all child objects of object e
child(e, n) = the n-th child object of object e
first-child(e) = the first child object of object e
last-child(e) = the last child object of object e
child-number(e, c) = n, if object c is the n-th child object of object e
descendents(e) = the set of all descendent objects of object e
left-sibling(e) = the left sibling object of object e
right-sibling(e) = the right sibling of object e Document Function Symbols for Object Relationships

FIG. 8 is-parent(e, c) = true, if object e is the parent of object c
is-ancestor(a, e) = true, if object a is an ancenstor of object e
is-child(c, e) = true, if object c is a child object of object e
is-first-child(e, c) = true, if object c is the first child object of object e
is-last-child(e, c) = true, if object c is the last child object of object e
is-descendent(d, e) = true, if object d is a descendent object of object e
is-sibling(e1, e2) = true, if objects e1 and e2 are siblings
is-left-sibling(e1, e2) = true, if object e1 is the left sibling of object e2
is-right-sibling(e1, e2) = true, if object e1 is the right sibling of object e2

Document Predicate Symbols for Object Relationships

FIG. 9

FIG. 10 object membership: in, under, above
object comparison: =, != string comparison: =, !=
pattern: { }
pattern extractor: / /
pattern membership: of
pattern matching: matches logical operations: not, or, and
general membership: member(<set-of-objects>, <object>)

Document Logical Operators directory d in <parent directory>;
file f in <directory>;

drectory-name(d) = the name of directory d
files(d) = the set of files in directory d
subdirectories(d) = the set of subdirectories in directory d
file-name(f) = the name of file f
base-name(f) = the base name of file f
extension(f) = the name extension of file f
conten(f) = the content of file f $<environment variable> = the value of an environment variable
working-directory() = the directory that contains all local documents to be checked
document-directory(<document file>) = the directory where the specified document file exists Document Function Symbols for Files and Directories $

FIG. 11 is-directory(d) =true, if d is a directory
is-file(f) = true, if f is a file
member(files(d), f) = true, if file f is in directory d Document Predicate Symbols for Files and Directories

FIG. 12 constraint C101: "Figure references"

for all
        e : AnyDoc in 31.sgm;
        a : ParaX, ParaX2, ParaX3, ParaX4, ParaX5 under e;
        p : string in content(a);
    there exist
        p1 : string in prefix(p);
    logical expression
        if
            p matches {"Figure "[.]+};
        imply
            p1 matches ( {"Figure "[0-9]+} or
                      {"Figure "[0-9]+(", "[0-9]+)*" and "[0-9]+} or
                      {"Figure "[0-9]+" - "[0-9]+} );
        action
            "W101: Invalid naming conventions for figure references.";
        end
end Example of Validating Figure References

FIG. 13 constraint C201: "Emphasis on KKS numbers"

for all
        e : AnyDoc in 31.sgm;
        a : ParaX, ParaX2, ParaX3, ParaX4, ParaX5 under e;
        p : string in content(a);
    there exist
        k : Emphasis under a;
    logical expression
        if
            p matches {"MB"[A-Z][0-9]2[A-Z]2[0-9]3};
        imply
            (k = parent-of-string(p)) and (p = content(k));
        action
            "W201: Every KKS number in a paragraph must be 'emphasized'.";
        end
    end

Example of Validating an Individual Object

FIG. 14

FIG. 15 constraint C301: "Figure references and figures"

for all
        e : AnyDoc in 31.sgm;
        a : ParaX, ParaX2, ParaX3, ParaX5 under e;
        p1 : string in content(a);
    there exist
        b : Figure under e;
        t : Title under b;
        p2 : string in content(t);
    logical expression
        if
            p1 matches {"Figure "[0-9]+};
        imply
            (p2 matches {"Figure "[0-9]+}) and (p1 = p2);
        action
            "W301: For every figure reference, there must exist one corresponding figure in the same document.";
        end
end Example of Validating Figure References and Figures

FIG. 16

S
constraint C302: "Figure reference and figure counts"

for all
        e : AnyDoc in 31.sgm;
        a : ParaX, ParaX2, ParaX3, ParaX5 under e;
        p1 : string in content(a);
        b : Figure under e;
        t : Title under b;
        p2 : string in content(t);
    counter
        n1 : for string p1;
        n2 : for string p2;
    logical expression
        if
            (p1 matches {"Figure "[0-9]+}) and (p2 matches {"Figure "[0-9]+});
        imply
            n1 = n2;
        action
            "W302: Counts of figure references and figures are not the same."
        end
end Example of Validating Figure Reference and Figure Counts H
constraint C303: "List of figure references and figures"

for all
        e : AnyDoc in 31.sgm;
        a : ParaX, ParaX2, ParaX3, ParaX4, ParaX5 under e;
        plist : string in content(a);
        p1: string in matching-substrings(plist);
    there exist
        b : Figure under e;
        t : Title under b;
        p2 : string in content(t);
    logical expression
        if
            plist matches {"Figures "/[0-9]+/(", "/[0-9]+/)*" and "/[0-9]+/};
        imply
            (p2 matches {"Figure "/[0-9]+/}) and (p1 = matching-substring(p2, 1));
        action
            "W303: For every figure reference in a figure reference list, there must exist one corresponding figure in the same document.";
        end
end Example of Validating List of Figure References and Figures

FIG. 17 constraint C304: "Reference List in System Description"

for all
        e : AnyDoc in 31.sgm;
    there exist
        a : DocHeader
        b : AnyDocX under e;
        a1 : DocType under a;
        b1 : ReferToList under b;
    logical expression
        if
            (child-number(e, a) = 1) and
            (a = parent(a1)) and (content(a1) = "System Description");
        imply
            (e = parent(b)) and (child-number(b, b1) = 1);
        action
            "W304: Every System Description must begin with a Reference List";
        end
end Example of Validating Document Structure

FIG. 18 constraint C401: "Document references and documents in Operation Manual"

for all
        e : AnyDoc in 31.sgm;
        a : ParaX, ParaX2, ParaX3, ParaX5 under e;
        p1 : string in content(a);
    there exist
        b : AnyDoc in 31.sgm
        c : DocFooter under b;
        d : DocNum under c;
    logical expression
        if
            p1 matches {"3.1-"[0-9]4"-"[0-9]4};
        imply
            (b = parent(c)) and (c = parent(d)) and (p1 = content(d));
        action
            "W401: For every reference to an Operation document, there must exist one corresponding Operation document in the Operation Manual.";
        end
end Example of Validating Document References and Documents

FIG. 19

Example of a Hyperlinked Structure

```
constraint C501: "Link for KKS numbers"

for all
        e : AnyDoc in 31.sgm;
        a : ParaX, ParaX2, ParaX3, ParaX4, ParaX5 under e;
        p : string in content(a);
    there exist
        k : Link under a;
    logical expression
        if
            p matches {"MB"[A-Z][0-9]2[A-Z]2[0-9]3};
        imply
            (k = parent-of-string(p)) and (content(k) = p) and (attribute(k, Linkend) != NULL);
        action
            "W501: Every KKS number must be hyperlinked.";
        end
end
```

Example of Validating a Link Object

FIG. 21 constraint C502: "Link from figure references and figures"

for all
        e : AnyDoc in 31.sgm;
        a : ParaX, ParaX2, ParaX3, ParaX5 under e;
        p1 : string in content(a);
    there exist
        k : Link under a;
        c : Figure under e;
        t : Title under c;
        p2 : string in content(t);
    logical expression
        if
            p1 matches {"Figure "[0-9]+};
        imply
            (k = parent-of-string(p1)) and (content(k) = p1) and (p2 matches {"Figure "[0-9]+})
            and (p1 = p2) and (attribute(k, Linkend) = attribute(c, Id));
        action
            "W502: Every figure reference must link to the corresponding figure in the same
            document.";
        end
end Example of Validating Figure Reference Links

FIG. 22 constraint C503: "Link from document references to documents"

for all
  e : AnyDoc in 31.sgm;
  a : ParaX, ParaX2, ParaX3, ParaX5 under e;
  p : string in content(a);
 there exist
  k : Link under a;
  b : AnyDoc in 31.sgm
  c : DocFooter under b;
  d : DocNum under c;
 logical expression
  if
   p1 matches {"3.1-"[0-9]4"-"[0-9]4};
  imply
   (k = parent-of-string(p1)) and (content(k) = p1) and
   (b = parent(c)) and (c = parent(d)) and (p1 = content(d)) and
   (attribute(k, Linkend) = attribute(d, Id));
  action
   "W503: Every reference to an Operation document must link to the corresponding Operation document in the Operation Manual.";
  end
end Example of Validating Document Reference Links

FIG. 23 constraint C504: "Link from KKS numbers to external media files"

for all
    e : AnyDoc in 31.sgm;
    a : ParaX, ParaX2, ParaX3, ParaX4, ParaX5 under e;
    p : string in content(a);
there exist
    k : Link under a;
    f : file under $MMDOCDBDIR/schematics;
logical expression
    if
        p matches {"MB"[A-Z][0-9]2[A-Z]2[0-9]3};
    imply
        (k = parent-of-string(p)) and (content(k) = p) and
        (attribute(k, Linkend) = file-name(f));
    action
        "W504: Every KKS number must link to an external schematic diagram in
        $MMDOCDBDIR/schematics.";
    end end Example of Validating External Media Links

FIG. 24

AUTOMATIC VALIDATION METHOD FOR MULTIMEDIA PRODUCT MANUALS

CROSS REFERENCE TO RELATED APPLICATIONS

This application claims the benefit of U.S. Provisional Application No. 60/318,343, filed Sep. 10, 2001.

FIELD OF THE INVENTION

The present invention relates to multimedia product documentation and, more particularly, to methods and systems for automatic validation of multimedia product manuals.

BACKGROUND OF THE INVENTION

Product documentation provides important instructions and relevant technical information for properly assembling, operating, and maintaining complex machinery. The quality of product documents is crucial to the success of a product, i.e., the technical information must be up-to-date, accurate, and consistent with a customer's product. Compared to non-technical documentation, the contents and structures of product documents are much more rigid and often comply to various industrial standards. Technical documents also tend to be highly cross-referenced, and often refer users to many different forms of technical data including textual instructions, schematic diagrams, computer-aided design (CAD) drawings, photo images of machine parts, video of inspection procedures, etc. In order to ensure the quality of product documentation, guidelines and standards for technical publication are often used in product development organizations.

However, documentation guidelines are often written informally and may not be easy to enforce fully. Consequently, the result varies, depending on the degree of self-discipline of the document authors. To support flexible manipulations, multimedia product documents are represented in Standard Generalized Markup Language (SGML). SGML-based product documents can be processed by a SGML parser and other SGML-based tools to extract and examine the contents and attributes of relevant document objects and their relationships. The SGML parser can check the documents against a Document Type Definition (DTD) and report syntax errors. However, the information provided by the SGML parser is based entirely on syntactical structure, which often is too encrypted for the document author to comprehend. On the other hand, documentation guidelines are often based on the semantics of documents, which can only be checked by examining contents and attributes of the relevant document objects. Some documentation guidelines also involve document objects that are not "directly" reedited to one another in the document structure, and thus cannot be easily specified in the DTD.

SUMMARY OF THE INVENTION

According to various embodiments of the present invention, techniques are provided for automatically validating the contents and structures of multimedia product documents. In the present invention, a Product Document Constraint Specification Language (PDCSL) is provided for the document author to represent various types of documentation guidelines as document constraints that must be enforced within the documents or across different documents. Each document constraint identifies a set of relevant document objects, and specifies a logical expression that is to be evaluated for each combination of the instances of the document objects. A Document Constraint Analyzer (DCA) takes as input a set of document files together with a document constraint specification file, extracts and examines the information associated with the document objects, and evaluates the logical expressions specified in the document constraints. If a logical expression evaluates to true, the corresponding documentation guideline has been followed properly. Otherwise, an action can be specified to correct the documents or provide an explanation to the document author.

BRIEF DESCRIPTION OF THE DRAWINGS

FIG. 3 illustrates an example of a document constraint specification;

FIG. 4 illustrates examples of document logical variables for document objects;

FIG. 5 illustrates document function symbols for content and attributes;

FIG. 6 illustrates document predicate symbols for content and attributes;

FIG. 7 illustrates document pattern matching predicate;

FIG. 8 illustrates document function symbols for object relationships;

FIG. 9 illustrates document predicate symbols for object relationships;

FIG. 10 illustrates document logical operators;

FIG. 11 illustrates document function symbols for files and directories;

FIG. 12 illustrates document predicate symbols for files and directories;

FIG. 13 illustrates an example of validating figure references;

FIG. 14 illustrates an example of validating an individual object;

FIG. 15 illustrates an example of validating figure references and figures;

FIG. 16 illustrates an example of validating figure reference and figure counts;

FIG. 17 illustrates an example of validating list of figure references and figures;

FIG. 18 illustrates an example of validating document structure;

FIG. 19 illustrates an example of validating document references and documents;

FIG. 21 illustrates an example of validating a link object;

FIG. 22 illustrates an example of validating figure reference links;

FIG. 23 illustrates an example of validating document reference links; and

FIG. 24 illustrates an example of validating external media links.

DESCRIPTION OF PREFERRED EMBODIMENTS

A multimedia product manual includes a set of related product documents, organized in a structured manner to facilitate browsing. A product manual can be as simple as a collection of schematic diagrams and CAD drawings to support manufacturing tasks at the early stages of a product, or as complex as a complete manual set with product documents in various media, including textual documents, schematic diagrams, CAD drawings, photo images of machine parts, and video clips of service procedures, etc., to support operation and maintenance of the product. A multimedia product manual can be organized as a structure of product information for customers or can be organized as a reference to on-line, up-to-date technical information.

Figure 1:
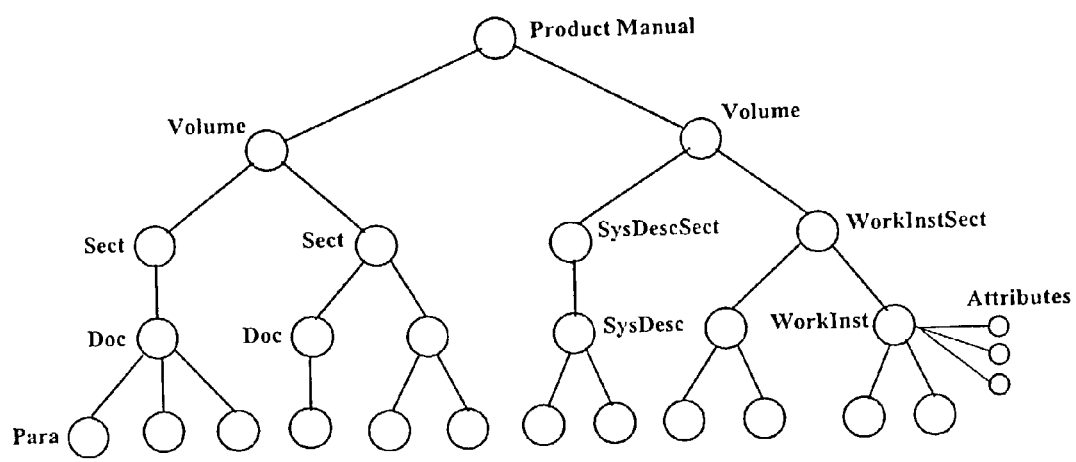
FIG. 1 illustrates an example of a product manual structure.

In general, a multimedia product manual is a hierarchical structure of document objects. An example is shown in FIG. 1. Some document objects are actually physical document files, referred to as product documents. It depends on the characteristics of the authoring tools and the document databases that are used to create and maintain the documents. A product manual can be divided into product documents in many ways. In general, a product document is a unit of product information that can be easily manipulated by the authoring tools and authors.

Product documents are component documents that are classified and assigned with identifiers and properties, and are stored in a document database. A component document may be related to other component documents and media files in the document database. Media files are also managed in the same way as component documents. Component documents and component media can be stored separately as files in file directories or stored directly as blobs in database tables, or objects in archives in a document management system.

In the present invention, component documents may be represented in Standard Generalized Markup Language (SGML). SGML is a meta-language for defining document structures, referred to as Document Type Definition. An SGML document structure is an instance of its associated DTD. Conceptually speaking, the structure of an SGML document is an upside-down tree that is composed of SGML elements (or more generally, document objects). An SGML element is thus either a leaf object whose content is the actual text (or any data code), or an interior object whose content is an SGML sub-structure, in addition to any possible text (or code). An SGML element is also associated with a list of attributes, e.g., id., type, name, that provides additional information to characterize the element. An SGML document structure can also be divided into SGML files in many ways to facilitate editing and maintenance.

Figure 2:
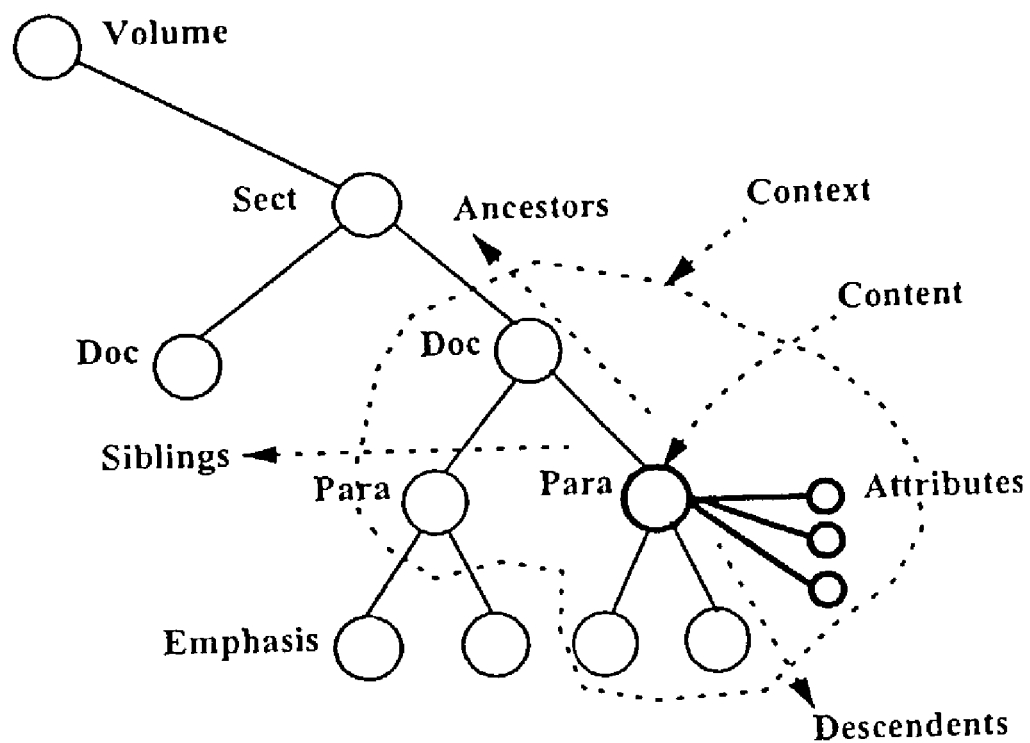
FIG. 2 illustrates an example of a document object.

Since SGML is a standard, SGML parsers and SGML-based tools are available in public domain and from vendors for processing and extracting information from SGML documents. The fundamental information that is required in order to check SGML documents are attributes, content, and context of the document objects, as shown in FIG. 2. The context of an object refers to the relationships between the object and all other objects in a document structure. Once the information of individual document objects can be identified and extracted, document objects can be checked individually, or multiple document objects can be checked together for their relationships.

In the present invention, a Product Document Constraint Specification Language (PDCSL) is provided for document authors to represent documentation guidelines. Each documentation guideline is represented as a document constraint, which is a logical expression (or logical statement) that involves document objects in some SGML documents.

A logical expression is evaluated and expected to yield true to indicate that the corresponding documentation guideline has been followed properly. However, in general, the exact document objects and the number of them that are involved in a logical expression cannot be determined beforehand. It is thus necessary to extend logical expressions to range-based predicate calculus such that quantifiers may be used to introduce variables and their domains. There are two kinds of quantifiers: universal and existential. Each quantifier defines a single variable and its domain to be used the logical expression that follows. To make parsing and evaluation simpler, a logical expression involving quantifiers are transformed into prenex normal form, i.e., all quantifiers appear first before a logical expression. If a list of quantifiers is specified, the logical expression is evaluated once for each combination of the values of all variables. If no quantifiers are specified, the logical expression is evaluated once only.

A document constraint specification file comprises a list of document constraint specifications. Each document constraint specification represents a documentation guideline, and it includes four sections: target object declaration with ranges, intermediate object declaration with ranges, counting object declaration with ranges, and if-otherwise document logical expression, as shown in FIG. 3.

Document logical variables are declared in the first three sections. The target-object-declaration-within-ranges section declares a set of target object variables and their ranges in some SGML documents of which all instances are to be checked in the logical expression that follows. The intermediate-object-declaration-with-ranges section declares a set of intermediate object variables of which at least one instance must also exist within document ranges, and they are often involved in the logical expression. The counting-object-declaration-with-ranges section declares a set of counting objects within ranges to denote the number of different values in the ranges for which some predicates inside logical expressions are true. The if-otherwise-document-logical-expression section includes an antecedent, a consequent, and an action. That is, if the antecedent is evaluated to true, the consequent is expected to be evaluated to true as well; otherwise, an action that follows is to be taken.

To make the specifications more compact, several constraints that share the same set of document logical variables can be combined. Thus, the logical expression section may contain more than one logical expression, and they are evaluated independently in turn. In addition, it is also possible to encode procedures in the action section to automatically correct the involved documents so that the corresponding documentation guideline is followed properly.

Target object declarations are used to enumerate "all instances" of a set of target objects that exist in the domain range of some SGML documents. Typically, target objects are document objects (i.e., SGML elements) in SGML documents. Some examples are shown in FIG. 4. The intermediate object declarations are used to identify "at least one instance" of a set of "related" objects in the domain range of the same or different SGML documents. The existence of at least one instance of the specified intermediate objects is the first set of requirements of the documentation guideline represented by the constraint specification. The "under" and "above" operators refer to the domain range which is a set of descendent and ancestor objects, respectively, in the document structure. The root object of a document structure is the first object defined in the SGML document file under the working directory. Refer to FIG. 11 for more details. Thus, the "above e" operator includes all objects above the object "e" up to the root object of the document in which the object "e" exists.

The keyword "ALL" refers to all types of objects available in a document. A counting object is declared to keep track of the counts of one or more than one type of document objects in the documents; it is handled in the same way as document objects, except that its content (i.e., the count) depends on the number of document objects that satisfy some constraint in the documents. Files and directories are also handled in the same way as document objects. Refer to FIG. 11 for more details.

Logical expressions are used to specify more complicated requirements that must be satisfied among the set of specified target, intermediate and counting objects. The antecedent and the consequent of each logical expression involve the information of the specified objects, including the SGML tag, attributes, and content of the objects, and the relationships of the objects with all other objects in the documents, as shown in FIG. 5. For an object "e", content(e) refers to the entire content of the object "e" including the contents of all its descendent objects, while proper content(e) refers to only the content of the object "e" itself, excluding the contents of all its descendent objects.

In addition, target and intermediate objects can also be patterns that occur in the content or attributes of the document objects, or substrings that occur in some patterns. If an attribute has a string value such as CDATA, patterns of the attribute values can also be specified. For a string "p", prefix(p) and suffix(p) are sets of all prefix and suffix strings, respectively; and matching-substrings(p) is a function of p and refers to a set of matching substrings of p after a pattern matching is performed.

Document predicates are also used to test the properties and relationships of document objects, which can be used in the logical expressions of document constraints. Document predicate symbols for testing the content and attributes of document objects are listed in FIG. 6.

Patterns that exist in the attributes and contents of the objects are often extracted and matched against various naming and numbering schemes defined by the documentation guidelines. In the proposed method, patterns are specified in a form of regular expression. That is, each pattern comprises a sequence of pattern terms, and each pattern term can be a subpattern or a subpattern group. A subpattern group is simply a small sequence of subpatterns enclosed in a pair of "(" and ")", which can be repeated for one or more times. The pattern matching capability is summarized in FIG. 7.

A subpattern or a subpattern group that is enclosed by a pair of "/" and "/" causes the matching string to be extracted and stored in the matching object, which can be accessed by the matching-substrings (<matching object>) function. Since sequences of patterns such as a list of figure references or document references are used frequently in technical documents, pattern matching may result in extracting a set of substrings from the document objects, which is used as the domain for checking the properties of the matching substrings. The relationships between objects are based on the hierarchical document structure. In technical documents, each object is related to all its ancestor objects (including parent object), all its sibling objects, and all its descendent objects (including all child objects) in some way. In addition, the first and last objects (of a set of objects) often behave slightly differently, so it is also important to be able to identify them individually. The object relationships are summarized in FIG. 8. However, objects that are not related to one another "directly" can be identified through several levels of the parent-child relationship, e.g., parent(parent(parent(Graphic)))=parent(parent(ParaX)) may be true in some DTD.

Document predicate symbols for the relationships between document objects in the document structure are listed in FIG. 9.

There are three sets of operators that are supported, as listed in FIG. 10. The precedence rule is the same as in any programming language, and parenthesis can be used to make evaluation order more explicit. For a set of objects and a single object, the general membership function member( ) is used to check if the specified object exists in the given set of objects.

As mentioned, physical documents such as multimedia data are typically represented as files in a file structure. It is thus necessary to be able to enumerate files and directories in order to check the presence of multimedia data files that are required in SGML documents. A summary of the file and directory operations is shown in FIG. 11. In the present invention, all identifiable entities are objects. Thus, a physical file is referred to as a file object, and a physical directory is referred to as a set of file objects. For a file object f, content(f) refers to the entire content of the file. Since both file and directory are objects, the general membership function member( ) can also be used to check if a file is in a directory.

$MMDOCDBDIR usually refers to a top-level, global document directory under which all shared and local document directories are stored, which is often fixed for a particular documentation project. In order to access all local documents that are to be checked by the specified document constraints, working-directory( ) refers to a top-level, local document directory under which one or more subdirectories of documents are stored, while document-directory (<document file>) refers to one of the subdirectories under which the specified document file exists. If there is only one directory of documents that are to be checked, working-directory( ) is the same as document-directory (any document file).

Document predicate symbols for testing the relationships between files and directories are listed in FIG. 12.

To ensure the quality of the product documents, there are several aspects of the product documents that need to be validated against the documentation guidelines. Based on the scope of the information, document validation is categorized into content patterns, individual objects, document structures, and document cross references. To produce professional-quality content, guidelines such as naming convention, cross referencing, etc., which usually appear at the beginning of all technical documents, must be followed properly so that there will be no need for additional explanation throughout the documents, and there will be no misinterpretation by the readers. As an example, C101 in FIG. 13 identifies all paragraphs <ParaX> (at all five levels) in all documents <AnyDoc> in the Operation Manual 31.sgm, and enumerates all patterns "p" in the contents of the paragraphs. If a pattern "p" begins with "Figure", followed by any number of any characters "[.]+", then at least there is a prefix "p1" of the pattern "p" that is a valid figure reference, e.g., "FIG. 1", "FIGS. 1,2, and 3", or "FIGS. 1–3". Note that [.] refers to any single character.

In product documents, technical terms are used to precisely identify machine parts, indicate various measurements, describe technical data, etc. Technical terms are often defined by various industry standards, and must be followed exactly. Similar to figure references, it is also possible to again enumerate all patterns "p" in all paragraphs <ParaX>, and if a pattern "p" resembles a KKS number (a numbering scheme used in the power plant industry), it must follow the numbering scheme defined in the KKS standard and any company-specific guidelines. Refer to FIG. 14 for examples of KKS patterns.

In SGML, domain-specific structures can be incorporated in documents with domain-specific document objects (i.e., domain-specific SGML tags), which makes the technical data more meaningful and useful for various product-related applications, e.g., extracting technical data for training and market presentations, hyperlinking machine part id's to spare parts lists, etc. Typically, all technical terms in the product documents must be marked up as an <Emphasis> object (or other domain-specific tag such as <KKSNumber>), so that they can be presented in a special font (or manipulated in a specific manner). As an example, C201 in FIG. 14 again enumerates all patterns "p" in all paragraphs <ParaX> in all documents <AnyDoc> in the Operation Manual 31.sgm. If a KKS number (e.g., MBA11CQO11) is found, it is expected to be enclosed in <Emphasis> all by itself. Note that content(a) is the content of an entire paragraph including the contents of all the descendent objects in the paragraph "a", and there may be intermediate SGML tags between <Emphasis> and a KKS number.

Compared to content patterns and individual objects, it is more difficult to ensure the consistency of all types of cross references in the product documents. For example, all figure references must refer to figures that actually exist in the same documents, all document references must refer to documents that actually exist in the same product manual, etc. As an example, the constraint C202 shown in FIG. 15 identifies all figure references such as "FIG. 1" in all paragraphs <ParaX> in all documents <AnyDoc> in the Operation Manual 31.sgm, and for each figure reference, it checks for a pattern in a figure title such as <Figure><Title>FIG. 1: . . . </Title> . . . </Figure> that matches exactly the figure reference.

Some documentation guidelines may refer to the counts of specific types or relationships of document objects in the documents. For example, the number of entries in a table of contents must equal the number of documents that exist in the document directory; otherwise, some documents may have been included or excluded by mistake. For validating object relationships, instead of validating individual documents, a simplified version of validation can also be performed by counting the objects that are involved. As an example, C302 in FIG. 16 counts the number of figure references and the number of figures in the same document, and reports any discrepancy. This type of validation may not be as accurate as validating individual object relationships. However, it provides a summarized view of the object relationships.

However, the pattern matching problem can get complicated. For example, when the target pattern includes a list of subpatterns, and each subpattern indicates a cross reference which has to be checked for consistency. As an example, C303 in FIG. 17 checks for the list of figure references, i.e., it identifies all figure reference lists such as "FIGS. 1, 2, and 3" in all paragraphs <ParaX> in all documents <AnyDoc> in the Operation Manual 31.sgm. For each figure reference list, it extracts a set of subpatterns (e.g., "1", "2", "3") during pattern matching, then checks each figure reference (i.e., "1", "2", "3", . . . ) in the subpatterns for a pattern in the corresponding figure title <Figure><Title>FIG. 1: . . . </Title> . . . </Figure>, <Figure><Title>FIG. 2: . . . </Title> . . . </Figure>, . . . in the same document.

In technical documents, some document objects are required in a particular type of documents. For example, all system description documents are required to begin with a list of references such as diagrams, drawings, instructions, test records, etc. As an example, C304 in FIG. 18 checks for the presence of the reference list <ReferToList> as the first child object in the body <AnyDocX> of each document <AnyDoc><DocHeader><DocType>System Description</DocType> . . . </DocHeader><AnyDocX> . . . /AnyDocX><DocFooter> . . . </DocFooter></AnyDoc>.

It is very important in technical documents that if a reference to a document is made, the referenced document must exist, for example, in the same product manual. As an example, C401 in FIG. 19 identifies all references to Operation documents such as "3.1-1056-9420" in all paragraphs <ParaX> in all documents <AnyDoc> in the Operation Manual 31.sgm, and checks for the presence of the exact document number in the footer <DocFooter> . . . <DocNum>3.1-1056-9420</DocNum></DocFooter> of the corresponding document in the Operation Manual 31.sgm.

Since SGML documents make references to other media files in the file structure, it is also necessary to check the presence of all the required external media files in the designated directories. Since file and directory are also objects, validating a file reference is similar to validating the presence of any document object. For example, it is possible to enumerate all file reference attributes in all graphic objects in all figures, and check for the corresponding media file in the predefined figure directory under the document directory. Refer to FIG. 24 for an example.

Figure 20:
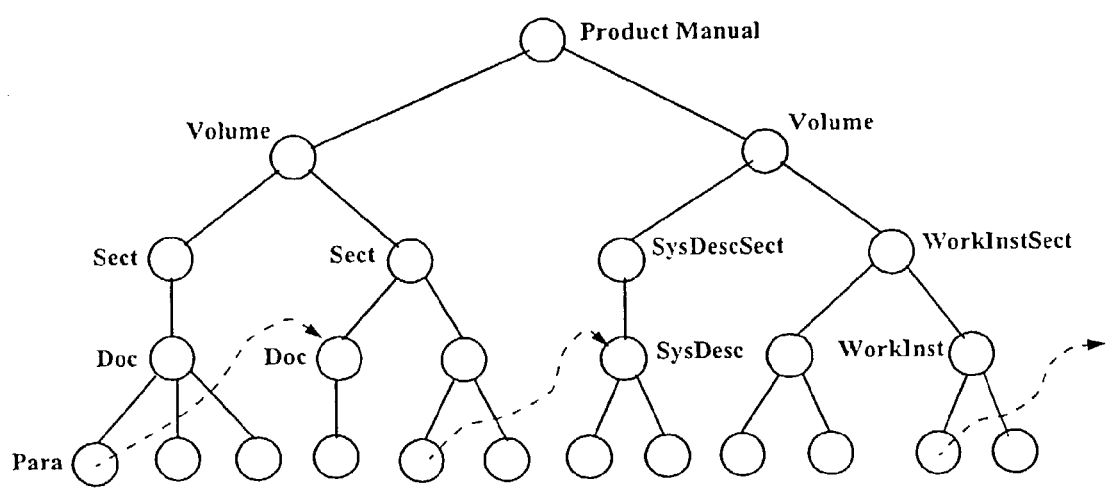
FIG. 20 illustrates an example of a hyperlinked structure.

A set of documents forms a static structure to support sequential reading, validation of the static structure ensures the quality of document content. Since document objects can be identified individually and related to one another by names, id's, or other addressing mechanism, other structures may also be superimposed on top of the static structure. In particular, to support flexible cross referencing in technical documents, a hyperlinked structure is usually created manually or automatically on the set of documents. Thus, validation of the hyperlinked structure ensures the quality of document usage. An example of a hyperlinked structure is shown in FIG. 20. A hyperlink relates one source object to one destination object. The destination object may be located in the same or different document, or may even be an external media file. To establish a hyperlink relationship, typically, the Id attribute of the destination object is recorded in an attribute, e.g., Linkend, of the source object.

Since PDCSL allows the user to enumerate all document objects in all product documents, it is also possible to specify constraints for the hyperlinking relationship between any two document objects in the same or different product manuals. There are several aspects of the hyperlinked structure that need to be validated, e.g., links for individual objects, links for object relationships, and links to external media files.

As an example, C501 in FIG. 21 simply checks if all KKS numbers have been linked to some document objects, i.e., each KKS number must be enclosed completely in a Link object, and the Linkend attribute must not be empty. Although such a constraint looks trivial, it can be extremely useful in detecting errors in the documents. For example, since all KKS numbers represent important machine parts referenced in the documents, they are to be linked to all relevant documents such as measurement tables, spare parts lists, schematic diagrams, etc. If a KKS number is not linked to any document, it can only mean that a potential inconsistency has occurred between the set of related documents.

Since it is not always possible to locate all related document objects in close proximity, hyperlinking is a mechanism to connect any spatially apart objects together, and make them more readily accessible to the readers. Validation of cross references increase the usability of the product documents. As an example, C502 in FIG. 22 checks for the presence of a link from all figure references <Link>FIG. 1 </Link> in all paragraphs <ParaX> to their corresponding figure titles <Figure><Title>FIG. 1: . . . </Title></Figure> in the same document <AnyDoc>.

From this example, it is also apparent that validating hyperlinked structures often also implicitly validates the corresponding static structures. Similarly, it is also possible to check for the presence of the links from all document references to all documents in the same or different product manuals. As an example, C503 in FIG. 23 enumerates all document references <Link>3.1-1056-9420</Link>in all paragraphs <ParaX> in all documents <AnyDoc>, and checks for the document number stored in <DocFooter><DocNum>3.1-1056-420</DocNum></DocFooter> of all documents <Any Doc> in the same product manual.

Some links also refer to external media files, as an example, C504 in FIG. 24 enumerates all KKS number links <Link>MBA10CQ011</Link> in all paragraphs <ParaX> in all documents <AnyDoc>, and checks for the presence of the attribute Linkend that refers to a corresponding external schematic diagram in a shared directory $MM1DOCDBDIR/schematics. For a complex, large scale product manual that is composed of hundreds and thousands of files, the capability of validating document references and external file references is a powerful mechanism to ensure the completeness of the product manuals during the authoring process.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for automatic validation of multimedia product manuals, comprising the steps of:
    inputting a set of multimedia product manual documents and a document constraint specification that includes a target object declaration with ranges section and an if-otherwise document logical expression section, said document constraint specification specifying each of one or more documentation guidelines as one or more logical expressions specifying requirements that are satisfied by a document objects associated with said set of documents, wherein said logical expressions include quantifiers that define variables and their domain;
    extracting information from document objects associated with the set of documents; and
    evaluating logical expressions contained in the document constraint specification to determine whether the extracted information follows documentation guidelines.

2. The method of claim 1, wherein the set of documents are represented in Standard Generalized Markup Language (SGML).

3. The method of claim 1, wherein said target-object-declaration-within-ranges section declares a set of target object variables and their ranges in said documents of which all instances are to be checked in a following logical expressions.

4. The method of claim 1, further comprising an intermediate-object-declaration-with-ranges section that declares a set of intermediate object varibles, wherein said intermediate object declarations identify at least one instance of a set of related objects in the domain range of the same or different documents.

5. The method of claim 1, further comprising a counting-object-declaration-with-ranges section that declares a set of counting objects with ranges, wherein counting objects track the counts of the one or more types of document objects in said documents.

6. The method of claim 1, wherein said if-otherwise-document-logical-expression section includes an antecedent, a consequent, and an action, wherein if the antecedent is evaluated to true, the consequent is evaluated to true, otherwise, the action that follows is taken.

7. The method of claim 6, further comprising combining constraints that share a same set of document logical variables, wherein the logical expression section contains more than one logical expression, which are evaluated independently in turn.

8. The method of claim 6, further comprising encoding a procedure in said action to automatically correct a document if the corresponding documentation guideline is not properly followed.

9. The method of claim 6, further comprising one or more document predicates to test the properties and relationships of document objects.

10. The method of claim 1, wherein said information includes attributes and content of said document objects and relationships between said document objects.

11. The method of claim 1, further comprising extracting patterns in said attributes and contents of said objects, and matching said patterns against naming and numbering schemes defined by said documentation guidelines.

12. The method of claim 10, wherein validating a relationship between document objects comprises counting the objects involved in said relationship.

13. The method of claim 1, wherein determining whether extracted information follows documentation guidelines comprises validating content patterns, individual objects, document structures, and document cross references.

14. The method of claim 13, wherein validating a document cross-reference comprises checking said cross reference for consistency including checking for the existence of figures in a figure reference list, checking for the existence of documents either in the same multimedia product manual or in external documents, checking the presence of external media files in their designated directories, and validating relationships specified by hyperlinks.

15. A system for automatic validation of multimedia product manuals, comprising:
    an input device for inputting a set of multimedia product manual documents and a document constraint specification that includes an intermediate object declaration with ranges section and an if-otherwise document logical expression section, said document constraint specification specifying each of one or more documentation guidelines as one or more logical expressions specifying requirements that are satisfied by document objects associated with said set of documents, wherein said logical include quantifiers that define variables and their domain;
    an extractor for extracting information from the set of documents; and
    an evaluator for evaluating one or more logical expression contained in the document constraint specification to determine whether the extracted information follows documentation guidelines.

16. The system of claim 15, further comprising a target-object-declaration-within-ranges section that declares a set of target object variables and their ranges in said documents of which all instances are to be checked in a following logical expressions.

17. The system of claim 15, wherein said intermediate-object-declaration-with-ranges section declares a set of intermediate object variables, wherein said intermediate object declarations identify at least one instance of a set of related objects in the domain range of the same or different documents.

18. The system of claim 15, further comprising a counting-object-declaration-with-ranges section that declares a set of counting objects with ranges, wherein counting objects track the counts of the one or more types of document objects in said documents.

19. The system of claim 15, wherein said if-otherwise-document-logical-expression section includes an antecedent, a consequent, and an action, wherein if the antecedent is evaluated to true, the consequent is evaluated to true, otherwise, the action that follows is taken.

20. A program storage device readable by a machine, tangibly embodying a program of instructions executable on the machine to perform method steps for automatic validation of multimedia product manuals, comprising the method steps of:

inputting a set of multimedia product manual documents and a document constraint specification that includes a counting object declaration with ranges section and an if-otherwise document logical expression section, said document constraint specification specifying each of one or more documentation guidelines as one or more logical expressions specifying requirements that are satisfied by document objects associated with said set of documents, wherein said logical expressions include quantifiers that define variables and their domain;

extracting information from document objects associated with the set of documents; and evaluating logical expressions contained in the document constraint specification to determine whether the extracted information follows documentation guidelines.

* * * * *